(12) United States Patent
Kim et al.

(10) Patent No.: US 8,274,374 B2
(45) Date of Patent: Sep. 25, 2012

(54) SYNCHRONIZATION METHOD BETWEEN READER AND TAG

(75) Inventors: Hyunseok Kim, Daejeon (KR); Su Na Choi, Gwangju (KR); Heyung Sub Lee, Daejeon (KR); Nak Seon Seong, Daejeon (KR); Cheol Sig Pyo, Daejeon (KR); Jong-Suk Chae, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 912 days.

(21) Appl. No.: 12/265,205

(22) Filed: Nov. 5, 2008

(65) Prior Publication Data
US 2009/0153309 A1    Jun. 18, 2009

(30) Foreign Application Priority Data

Dec. 17, 2007 (KR) .................. 10-2007-0132209

(51) Int. Cl.
*H04Q 5/22* (2006.01)
*G08B 13/14* (2006.01)
*G04F 1/00* (2006.01)

(52) U.S. Cl. .............. 340/10.5; 340/10.1; 340/10.2; 340/10.3; 340/10.4; 340/572.4; 702/176

(58) Field of Classification Search ............ None
See application file for complete search history.

(56) References Cited

U.S. PATENT DOCUMENTS

| | | | |
|---|---|---|---|
| 5,754,596 A * | 5/1998 | Bischoff et al. | 375/295 |
| 7,783,451 B2 * | 8/2010 | Wilcox et al. | 702/176 |
| 2001/0030625 A1 * | 10/2001 | Doles et al. | 342/387 |
| 2007/0035383 A1 * | 2/2007 | Roemerman et al. | 340/10.1 |
| 2007/0096984 A1 * | 5/2007 | Leitch et al. | 342/453 |
| 2007/0205871 A1 * | 9/2007 | Posamentier | 340/10.3 |
| 2007/0253512 A1 | 11/2007 | Lawrow et al. | |
| 2009/0040025 A1 * | 2/2009 | Volpi et al. | 340/10.1 |
| 2009/0140883 A1 * | 6/2009 | Rani et al. | 340/936 |

FOREIGN PATENT DOCUMENTS

KR    100784055 B1    12/2007

OTHER PUBLICATIONS

"Tag to Reader Synchronization", Report to ISO SC31/WG4/SG3, Document No. #613, published Nov. 5, 2007 at www.autoid.org. Telematics USN Research Division, ETRI, pp. 1-10.

* cited by examiner

*Primary Examiner* — George Bugg
*Assistant Examiner* — Renee Dorsey
(74) *Attorney, Agent, or Firm* — Kile Park Goekjian Reed & McManus PLLC

(57) ABSTRACT

Disclosed is a synchronization method between a reader and tag according to an example embodiment, the method including: transmitting, by the reader, a first write command message to the tag at a first time; detecting, by the tag, the first write command message from the reader at a second time and transmitting a first response message to the reader in response to the first write message; transmitting, by the reader, a second write command message including first time information of the first time to the tag; and correcting, by the tag, a clock offset using a difference between the first time and the second time.

14 Claims, 3 Drawing Sheets

SYNCHRONIZATION METHOD BETWEEN READER AND TAG

CROSS-REFERENCE TO RELATED APPLICATION

This application claims the benefit of Korean Patent Application No. 10-2007-0132209, filed on Dec. 17, 2007, in the Korean Intellectual Property Office, the disclosure of which is incorporated herein by reference.

BACKGROUND OF THE INVENTION

1. Field of the Invention

The present invention relates to a synchronization method between a reader and tag, in particular, to calculating a clock offset between the reader and tag and a message delay time, and thus synchronizing the reader with the tag or synchronizing the tag with the reader using the clock offset and the message delay time.

This work was supported by the IT R&D program of MIC/IITA. [2005-S-106-03, Development of Sensor Tag and Sensor Node Technologies for RFID/USN]

2. Description of Related Art

Recently, development of a semi-passive RFID tag containing a sensor which is available in a monitoring environment and its commercialization have been major issues. The semi-passive RFID tag containing the sensor enables a variety of application scenarios to be embodied. For example, the semi-passive RFID tag may be used for a sensor network.

The structural complexity of a sensor tag itself may be various depending on the accuracy of a clock of the sensor tag. That is, when the sensor tag simply monitors environment, such as a temperature, and is used for recording a deviation from a predetermined condition, the sensor tag may be designed to have a simple structure. That is, in this instance, accurate synchronization between the sensor tag and the reader is not required.

However, when the sensor tag stores an accurate time stamp together with environment information, synchronization of a local clock in the tag with a system clock of a reader is required. For example, when a product falls out of a production line, the local clock should be continuously synchronized with the system clock in order to accurately trace the time the product fell out of the production line.

Regularly synchronizing a clock is one of various synchronization methods between a tag and a reader in a conventional art. For example, every time sensing data is transmitted to a reader, synchronization between a tag and a reader may be operated. To achieve the above, a timer itself is treated as a register that is mapped to a specific region of a user memory so as to control a standard air interface through a command. Also, the timer is treated as a type of a special sensor so as to correct time information through an existing sensor access command.

However, the synchronization method between the tag and the reader according to the conventional art has a problem that it cannot guarantee accuracy. Accordingly, development of new technology which can accurately synchronize a reader and a tag is required.

SUMMARY OF THE INVENTION

An aspect of the present invention provides a synchronization method between a reader and a tag, which can accurately synchronize a reader and a tag using a relatively simple method, wherein calculating a clock offset between the reader and tag and message delay time, and synchronizing the reader with the tag using the clock offset and the message delay time is performed.

Another aspect of the present invention also provides a synchronization method between a reader and a tag, which can accurately synchronize a reader and a tag using a relatively simple method, wherein calculating a clock offset between the reader and tag and message delay time, and synchronizing the tag with the reader using the clock offset and the message delay time is performed.

According to an aspect of the present invention, there is provided a synchronization method between a reader and a tag, including: transmitting, by the reader, a first write command message to the tag at a first time; detecting, by the tag, the first write command message from the reader at a second time and transmitting a first response message to the reader in response to the first write message; transmitting, by the reader, a second write command message including first time information of the first time to the tag; and correcting, by the tag, a clock offset using a difference between the first time and the second time.

According to another aspect of the present invention, there is provided a synchronization method between a reader and tag, including: transmitting a second write command message including first time information of a first time to the tag at a fifth time, when the reader receives a first response message from the tag at a fourth time in response to a first write command message transmitted to the tag at the first time; correcting a clock offset using a difference between a second time and the first time, the second time being a time when the tag receives the first write command message from the reader; transmitting, by the tag, a second response message to the reader at a seventh time in response to the second write command message; transmitting a third write command message including eighth time information of an eighth time at a ninth time, when the reader receives the second response message from the tag at the eighth time; and correcting, by the tag, a delay time using a difference between the seventh time and the eighth time.

According to still another aspect of the present invention, there is provided a synchronization method between a reader and a tag, comprising: transmitting, by the reader, a first read command message including first time information to the tag at a first time; transmitting a second time message including second time information to the reader at a third time, the second time information being information of a second time, the second time being a time when the tag detects the first read command message from the reader; and correcting, by the reader, a clock offset using a difference between the first time and the second time.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EXEMPLARY EMBODIMENTS

Figure 1:
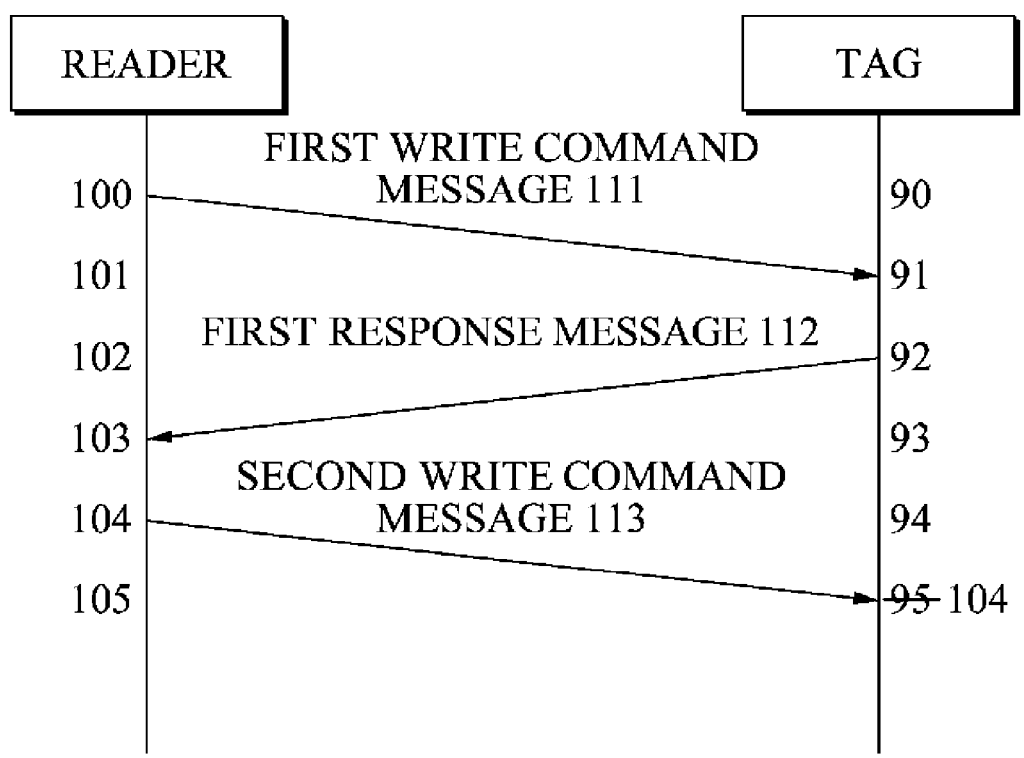
FIG. 1 is a flowchart illustrating a method of correcting a clock offset in a synchronization method between a reader and a tag according to an example embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

In a synchronization method between a reader and a tag, a clock difference between the reader and tag occurs due to a clock offset or a clock drift and message delay. Thus, clock synchronization between the reader and the tag is embodied by correcting the clock offset and message delay. The message delay occurs due to propagation delay and processing delay.

Since the clock drift between the reader and tag occurs independent from each other, correction of the clock offset and message delay is repeatedly performed in the synchronization between the reader and tag.

The reader and the tag according to an example embodiment of the present invention may contain a Real Time Clock (RTC). Also, the reader and tag are capable of recording a time of transmitting/receiving a message in a memory region. Also, for convenience of description, the present specification describes the invention referring to an example that a message delay is generated to have at least the same size between forward link and return link.

FIG. 1 is a flowchart illustrating a method of correcting a clock offset in a synchronization method between a reader and a tag according to an example embodiment.

The synchronization method between the reader and the tag according to an example embodiment is embodied as a method of synchronizing the tag with a time of the reader.

According to an example embodiment, the reader transmits a first write command message to a tag at a first time in operation 111. That is, the reader records the first write command message in a memory region, $t_s$, and then transmits the first write message to the tag, thereby informing a start of a synchronization round. The memory region, $t_s$, indicates a memory region that is assigned for synchronization of a time in the memory of the tag, and the first write command message may be embodied as "Write($t_s$, 0)".

The first time which is a time when the reader transmits the first write command message may be embodied as 100 seconds as shown in FIG. 1. A unit of the time may be embodied as an Arbitrary Unit (AU). However, for convenience of description, the present invention is described referring to an example of using seconds as a unit of time.

The tag is detected in the first write command message at a second time (91 seconds) from the reader. The tag records, in the memory region, information of the second time (91 seconds) which is a time when the tag detects the first write command message.

The tag transmits a first response message to the reader in response to the first write command message in operation 112. The tag may transmit the first response message to the reader at a third time (92 seconds). The first response message may be embodied as a "Rep (success)".

The reader receives the first response message from the tag at a fourth time (103 seconds). The reader records the first time (100 seconds) in the memory region, and then transmits a second write command message including the first time information (100 seconds) to the tag at a fifth time (104 seconds). The second write command message may be embodied as "BlockWritten($t_s$, 100)" which is a BlockWrite message in operation 113.

The tag receives the second write command message from the reader at a sixth time (95 seconds). The tag corrects a clock offset using the first time (100 seconds) included in the second write command message and the second time (91 seconds).

That is, as a time of the tag is 90 seconds when a time of the reader is 100 seconds in FIG. 1, the clock offset between the reader and the tag is embodied as 10 seconds.

Thus, the tag may calculate a difference (9 seconds) between the first time (100 seconds) and the second time (91 seconds), and then synchronize its time with the time of the reader, the first time being a time of the reader when the reader transmits the first write command message and the second time being a time of the tag when the tag receives the first write command message from the reader.

That is, the tag adds the difference (9 seconds) between the first time (100 seconds) and the second time (91 seconds) to the sixth time (95 seconds) that is a time of the tag when the tag receives the second write command message from the reader so as to correct a present time of the tag, the sixth time, from 95 seconds to 104 seconds, thereby synchronizing the time of the tag with the time of the reader.

However, as a result of the synchronization, a present time of the tag is 104 seconds when a present time of the reader is 105 seconds. The synchronization is not completely performed. The incomplete synchronization is caused by a message delay according to a difference between a time of receiving a first response message 112 by the reader and a time of transmitting the second write command message by the reader. Hereinafter, correcting of the message delay is described below referring to FIG. 2.

Figure 2:
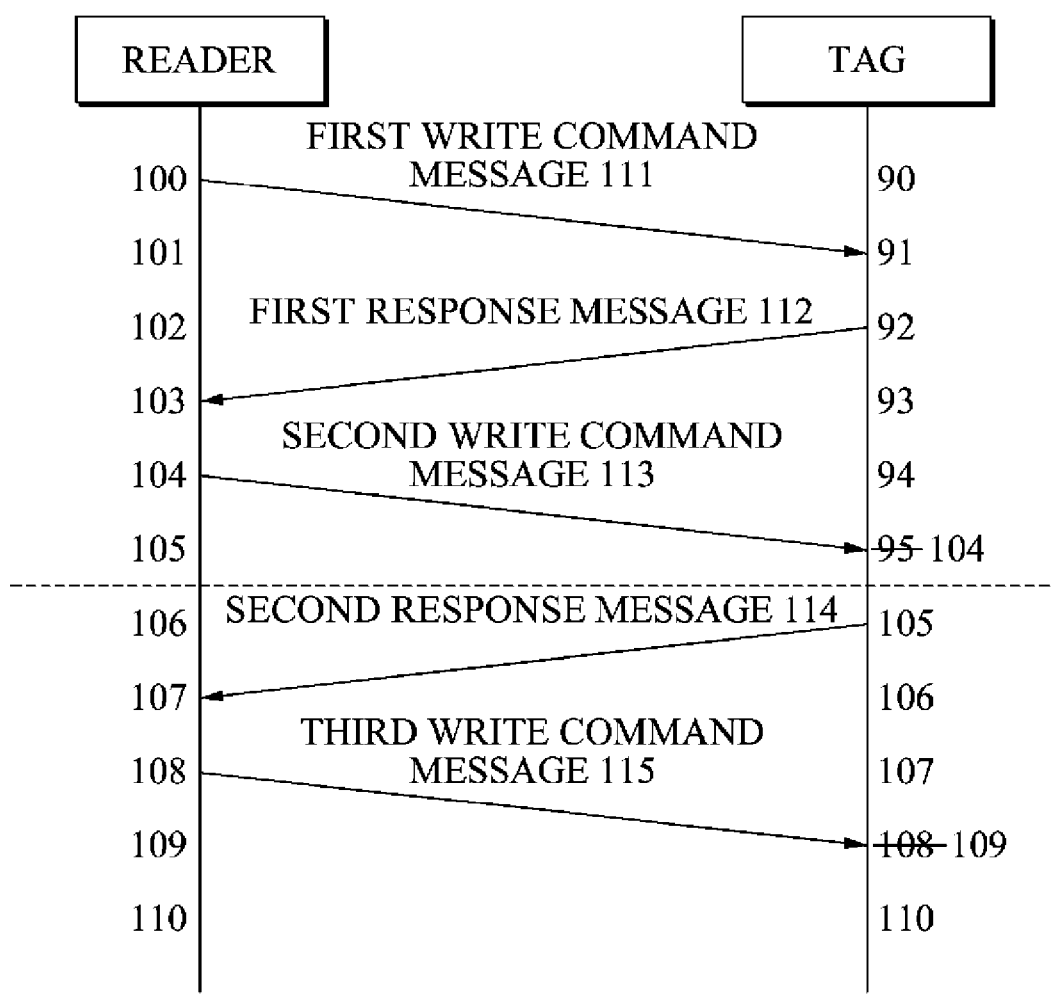
FIG. 2 is a flowchart illustrating a method of correcting a clock offset and a method of correcting message delay in a synchronization method between a reader and a tag according to an example embodiment.

FIG. 2 is a flowchart illustrating a method of correcting a clock offset and a method of correcting message delay in a synchronization method between a reader and a tag according to an example embodiment.

Since operations 111 through 113 are embodied in the same way as the method of correcting a clock offset described in FIG. 1, operations 111 through 113 in FIG. 2 are omitted.

As previously described in FIG. 1, the tag may change a sixth time from 95 seconds to 104 seconds, and then correct a clock offset with the reader.

After the correction of the clock offset, the tag transmits a second response message (Rep(success)) at a seventh time (105 seconds) in response to the second write command message in operation 114.

The reader may receive the second response message from the tag at an eighth time (107 seconds). The reader records the eighth time in a memory region. The reader transmits a third write command message (BlockWritten($t_d$, 107)) to the tag at a ninth time (108 seconds) in operation 115.

As described above, the message delay respectively occurs in operations 113 and 115. That is, although the second write command message transmitted from the reader to the tag includes a fourth time (103 seconds), the reader transmits the second write command message at a fifth time (104 seconds) to the tag, and thus one second of message delay time occurs.

Also, although the third write command message transmitted from the reader to the tag includes an eighth time (107 seconds), the reader transmits the third write command message at ninth time (108 seconds), and thus one second of message delay time occurs again.

Accordingly, the tag which receives the third write command message at a tenth time (108 seconds) from the reader may correct the message delay time by adding a value (1 second) to the tenth time, the value being obtained by dividing a difference between the eight time (107 seconds) and the seventh time (105 seconds) by 2. That is, it changes the tenth time from 108 seconds to 109 seconds to correct the message delay time, thereby performing synchronization with the reader.

Figure 3:
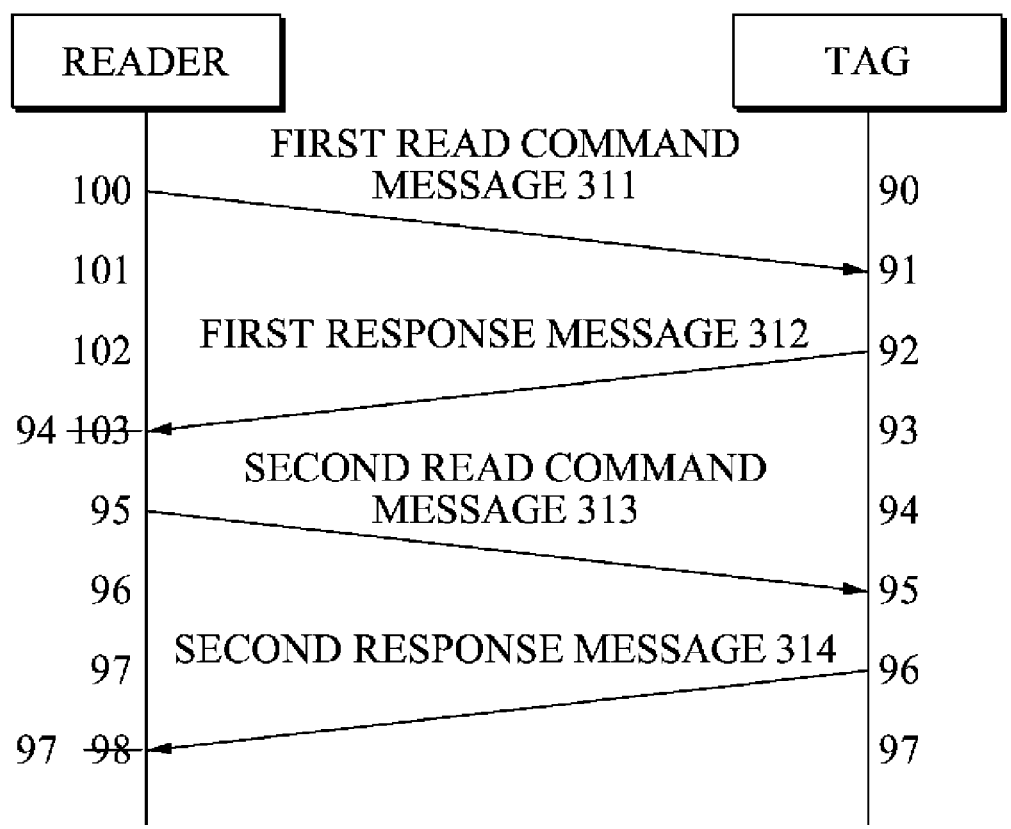
FIG. 3 is a flowchart illustrating a synchronization method between a reader and a tag according to another example embodiment.

FIG. 3 is a flowchart illustrating a synchronization method between a reader and a tag according to another example embodiment.

According to another example embodiment, a synchronization method between a reader and a tag may be embodied as a method of synchronizing the reader with the tag. This may be embodied when the reader is required to accurately recognize a clock drift with the tag.

For example, when a tag embodied as a sensor monitors an environment for a long time, such as months or years, the clock drift may become significant. That is, when accumulated information in the sensor tag is transmitted to a reader, the reader is required to accurately recognize a RTC difference with the tag so as to exactly analyze the information received from the tag.

According to an example embodiment, the reader transmits a first read command message to the tag at an eleventh time (100 seconds) in operation 311. The first read command message may be embodied as "Read ($t_d$)".

The tag detects the first read command message from the reader at a twelfth time (91 seconds). The tag records the twelfth time (91 seconds) which is a time when the first read command message is detected in a memory region.

The tag transmits a first response message corresponding to the read command message to the reader at a thirteenth time (92 seconds) in operation 312. The first response message may be embodied as "$t_v$=91" which includes the twelfth time (91 seconds), the twelfth time being a time when the first read command message is detected. The tag records the thirteenth time (92 seconds) which is a time when the first response message is transmitted to the reader in the memory region.

The reader receives the first response message at a fourteenth time (103 seconds) from the tag, and records the fourteenth time (103 seconds) in the memory region. The reader corrects a clock offset with the tag using a difference between the eleventh time (100 seconds) and the twelfth time (91 seconds).

That is, the reader subtracts a difference (9 seconds) between the eleventh time (100 seconds) and the twelfth time (91 seconds) from the fourteenth time (103 seconds), and then corrects the fourteenth time from 103 seconds to 94 seconds, thereby correcting the clock offset with the tag.

The reader, after the correcting of the clock offset, transmits a second read command message to the tag at fifteenth time (95 seconds) in operation 313. The second read command message may be embodied as "Read ($t_v$)" which is a message to read the memory region of the tag.

The tag receives the second read command message from the reader at a sixteenth time (95 seconds). The tag transmits a second response message corresponding to the second read command message to the reader at a seventh time (96 seconds).

The second read command message may be embodied as "$t_v$=92" which is a message including the thirteenth time (92 seconds) which is a time when the tag transmits the first response message to the reader.

The reader receives the second response message from the tag at an eighteenth time (98 seconds). The reader may correct a message delay time occurring during the message transmission process with the tag, using a difference between the thirteenth time (92 seconds) and the corrected fourteenth time (94 seconds). That is, the reader subtracts the difference (2 second) between the thirteenth time (92 seconds) and the corrected fourteenth time (94 seconds) from the eighteenth time (98 seconds), and then corrects the eighteenth time from 98 seconds to 96 seconds. Thus, synchronization with the tag based on the message delay time correction may be performed.

According to a synchronization method between a reader and a tag of the present invention, a clock offset between the reader and the tag and message delay time is calculated. Thus, the present invention has an effect of a simple and accurate synchronization between the reader and the tag.

Although it has been described that a synchronization method between a reader and a tag according to example embodiments shown in FIG. 1 to FIG. 3 is embodied as a control (read, write, blockwrite) by a command through standard air interface, the synchronization method may be embodied through a sensor access command set.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A synchronization method between a reader and a tag, wherein the reader comprises a reader clock, and wherein the tag comprises a tag clock, the method comprising:

transmitting, by the reader, a first write command message to the tag at a first time of the reader clock;

detecting, by the tag, the first write command message from the reader at a second time of the tag clock, and transmitting a first response message to the reader in response to the first write message;

transmitting, by the reader, a second write command message including first time information of the first time to the tag;

adjusting a time of the tag clock by a first value, wherein the first value equals the difference between the first time and the second time;

transmitting, by the tag, a second response message in response to the second write command message at a seventh time of the tag clock;

detecting, by the reader, the second response message from the tag at an eighth time of the reader clock and recording eighth time information of the eighth time in a memory region;

transmitting, by the reader, a third write command message including the eighth time information to the tag at a ninth time of the reader clock;

receiving, by the tag, the third write command message from the reader at a tenth time of the tag clock; and adjusting a time of the tag clock by a second value, wherein the second value equals one half of the difference between the seventh time and the eighth time.

2. The method of claim 1, wherein the reader and the tag respectively include a Real Time Clock (RTC), and the first adjusting comprises the tag adding the first value to the present time of the tag RTC, or subtracting the first value from the present time of the tag RTC.

3. The method of claim 1, wherein the reader records, in a memory region, the first time information of the first time, fourth time information of a fourth time, the fourth time being a time of the reader clock when the first response message is received from the tag, and fifth time information of a fifth time, the fifth time being a time of the reader clock when the second write command message is transmitted to the tag.

4. The method of claim 1, wherein the tag records the first time information of the first time, second time information of the second time, third time information of a third time, the third time being a time of the tag clock when the first response message is transmitted to the reader, and sixth time information of a sixth time, the sixth time being a time of the tag clock when the second write command message is received from the reader.

5. The method of claim 1, wherein the second adjusting comprises:
adding the second value to the tenth time or subtracting the second value from the tenth time.

6. A synchronization method between a reader and tag, wherein the reader comprises a reader clock, and wherein the tag comprises a tag clock, the method comprising:
transmitting a second write command message including first time information of a first time to the tag at a fifth time of the reader clock, wherein the reader receives a first response message from the tag at a fourth time of the reader clock in response to a first write command message transmitted to the tag at the first time of the reader clock;
adjusting a time of the tag clock by a first value, wherein the first value equals the difference between a second time and the first time, the second time being a time of the tag clock when the tag receives the first write command message from the reader;
transmitting, by the tag, a second response message to the reader at a seventh time of the tag clock in response to the second write command message;
transmitting a third write command message including eighth time information of an eighth time of the reader clock at a ninth time of the reader clock, wherein the reader receives the second response message from the tag at the eighth time; and
adjusting a time of the tag clock by a second value, wherein the second value equals one half of the difference between the seventh time and the eighth time.

7. The method of claim 6, wherein the message delay time is generated between the fourth time and the fifth time and between the eighth time and the ninth time.

8. The method of claim 6, the second adjusting comprising:
adding the second value to a tenth time or subtracting the second value from the tenth time, wherein the tenth time is a time of the tag clock when the tag receives the third write command message from the reader.

9. A synchronization method between a reader and a tag, wherein the reader comprises a reader clock, and wherein the tag comprises a tag clock, the method comprising:
transmitting, by the reader, a first read command message including first time information to the tag at a first time of the reader clock;
transmitting a first response message including second time information to the reader at a third time of the tag clock, the second time information being information of a second time, the second time being a time of the tag clock when the tag detects the first read command message from the reader;
adjusting a time of the reader clock by a first value, wherein the first value equals the difference between the first time and the second time
transmitting, by the reader, a second read command message to the tag at a fifth time of the reader clock;
transmitting a second response message including third time information of the third time to the reader at a seventh time of the tag clock in response to the second read command message, wherein the tag receives the second read command message from the reader at a sixth time of the tag clock; and
adjusting a time of the reader clock by a second value, wherein the second value equals one half of the difference between the third time and a fourth time, wherein the fourth time is a time of the reader clock when the reader receives the first response message from the tag.

10. The method of claim 9, wherein the first adjusting comprises:
adding the first value to the present time of the reader clock or subtracting the first value from the present time of the reader clock.

11. The method of claim 9, wherein the second adjusting comprises:
adding the second value to an eighth time or subtracting the second value from the eighth time, wherein the eighth time is a time of the reader clock when the reader receives the second response message from the tag.

12. The method of claim 1, wherein the tag is attached to an object and comprises one or more sensors configured to store time and environment information associated with the object, and wherein the reader is configured to track the location of the object by receiving the time and environment information from the tag.

13. The method of claim 1, wherein the distance between the tag and the reader is unknown, to the reader and to the tag, at the time of the first adjusting.

14. The method of claim 6, wherein the distance between the tag and the reader is unknown, to the reader and to the tag, at the time of the first adjusting and at the time of the second adjusting.

* * * * *